(12) United States Patent
Tanimoto et al.

(10) Patent No.: US 11,036,158 B1
(45) Date of Patent: Jun. 15, 2021

(54) IMAGE FORMING APPARATUS WHICH CONTROLS TIME INTERVAL BETWEEN FIRST AND SECOND IMAGE DATA BASED ON PRINT HEAD EMISSION TIME

(71) Applicant: TOSHIBA TEC KABUSHIKI KAISHA, Tokyo (JP)

(72) Inventors: Koji Tanimoto, Tagata Shizuoka (JP); Takeshi Watanabe, Yokohama Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/025,549

(22) Filed: Sep. 18, 2020

(51) Int. Cl.
| | |
|---|---|
| *G03G 15/04* | (2006.01) |
| *G06K 15/00* | (2006.01) |
| *B41J 2/00* | (2006.01) |
| *G06K 15/14* | (2006.01) |
| *G06K 15/12* | (2006.01) |
| *G03G 15/32* | (2006.01) |
| *B41J 2/447* | (2006.01) |
| *G03G 15/01* | (2006.01) |
| *G03G 15/043* | (2006.01) |
| *G06K 15/16* | (2006.01) |

(52) U.S. Cl.
CPC ........ *G03G 15/04054* (2013.01); *B41J 2/447* (2013.01); *G03G 15/326* (2013.01); *G06K 15/129* (2013.01); *G06K 15/1247* (2013.01); *G06K 15/14* (2013.01); *G03G 15/011* (2013.01); *G03G 15/043* (2013.01); *G06K 15/16* (2013.01)

(58) Field of Classification Search
CPC ............... G03G 15/011; G03G 15/043; G03G 15/04054; G03G 15/04063; G03G 15/326; G03G 2215/0407; G03G 2215/0409; G03G 2215/0412; B41J 2/45; B41J 2/447; G06K 15/14; G06K 15/129; G06K 15/16; G06K 15/1247; G06K 15/1261
USPC ............... 399/4, 51, 220; 347/118, 130, 139
See application file for complete search history.

(56) References Cited

U.S. PATENT DOCUMENTS

| | | | | |
|---|---|---|---|---|
| 5,384,591 | A | * | 1/1995 | Tsuda .................. G06K 15/1247 347/130 |
| 2010/0194841 | A1 | * | 8/2010 | Tsujino ............ G03G 15/04072 347/224 |
| 2016/0282751 | A1 | * | 9/2016 | Yano .................... G03G 15/043 |
| 2018/0299801 | A1 | * | 10/2018 | Ohshima .................. H04N 1/06 |

FOREIGN PATENT DOCUMENTS

| | | | |
|---|---|---|---|
| JP | 62282957 | A * | 12/1987 |
| JP | 2004-191458 | A | 7/2004 |
| JP | 2007-076341 | A | 3/2007 |
| JP | 2008-087196 | A | 4/2008 |
| JP | 2017-170810 | A | 9/2017 |

\* cited by examiner

*Primary Examiner* — Robert B Beatty
(74) *Attorney, Agent, or Firm* — Foley & Lardner LLP

(57) ABSTRACT

An image forming apparatus includes a print head, a detector, and a controller. The print head includes one or more light emitting element arrays, each light emitting element array includes a plurality of light emitting elements. The detector is configured to detect an emission time of the print head that emits light according to image data. The controller is configured to control a time interval to a print start corresponding to second image data, the second image data following first image data, based on a detection result of an emission time corresponding to the first image data.

19 Claims, 15 Drawing Sheets

FIG. 13

| MAXIMUM EMISSION TIME | REFERENCE CURRENT | FIRST CURRENT (CURRENT 5% UP) | SECOND CURRENT (CURRENT 10% UP) |
|---|---|---|---|
| 20% OR LOWER | NO CHANGE | 5% EXTENSION | 10% EXTENSION |
| 40% OR LOWER | 5% EXTENSION | 10% EXTENSION | 15% EXTENSION |
| 60% OR LOWER | 10% EXTENSION | 15% EXTENSION | 20% EXTENSION |
| 80% OR LOWER | 15% EXTENSION | 20% EXTENSION | 25% EXTENSION |
| HIGHER THAN 80% | 20% EXTENSION | 25% EXTENSION | 30% EXTENSION |

IMAGE FORMING APPARATUS WHICH CONTROLS TIME INTERVAL BETWEEN FIRST AND SECOND IMAGE DATA BASED ON PRINT HEAD EMISSION TIME

FIELD

Embodiments described herein relate generally to an image forming apparatus.

BACKGROUND

An electrophotographic printer (hereinafter referred to as "printer") including a print head is widely used. The print head includes a plurality of light emitting elements such as light emitting diodes (LED) or organic light emitting diodes (OLED). For example, light emitting elements corresponding to 15400 pixels are provided in the print head, where a direction in which the light emitting elements are arranged corresponds to a main scanning direction, and a direction perpendicular to the main scanning direction corresponds to a sub-scanning direction. In the printer, a photoconductive drum is exposed to light emitted from the light emitting elements, and an image corresponding to a latent image formed on the photoconductive drum is printed on a sheet as recording paper.

DESCRIPTION OF THE DRAWINGS

FIG. 13 is a diagram illustrating an example of a time setting table applied to a control of a time interval to a print start that is executed by the image forming apparatus according to the second embodiment;

DETAILED DESCRIPTION

Figure 1:
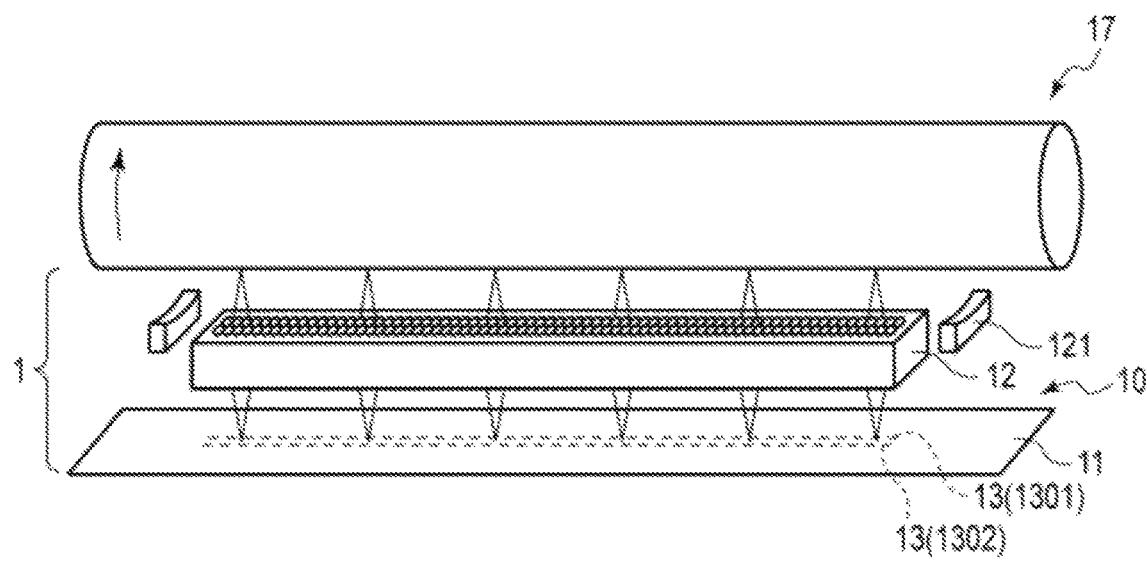
FIG. 1 is a diagram illustrating an example of a position relationship between a photoconductive drum and a print head that is applied to an image forming apparatus according to first and second embodiments.

In general, according to at least one embodiment, an image forming apparatus includes a print head, a detection unit (detector), and a controller. The print head includes one or more light emitting element arrays, each light emitting element array includes a plurality of light emitting elements. The detection unit is configured to detect an emission time of the print head that emits light according to image data. The controller is configured to control a time interval to a print start corresponding to second image data, the second image data following first image data, based on a detection result of an emission time corresponding to the first image data.

Hereinafter, an example of an image forming apparatus according to first and second embodiments will be described with reference to the drawings. In the respective drawings, the same components will be represented by the same reference numerals. The image forming apparatus is a printer, a copying machine, or a multi-function peripheral (MFP). In the first and second embodiments, an image forming apparatus corresponding to an MEP will be described.

First and Second Embodiments: Configuration of Print Head

An example of a configuration of a print head that is applied to the image forming apparatus according to the first and second embodiments will be described with reference to FIGS. 1 to 8.

FIG. 1 is a diagram illustrating an example of a position relationship between a photoconductive drum and the print head that is applied to the image forming apparatus according to the first and second embodiments.

The image forming apparatus includes a photoconductive drum 17 and a print head 1 illustrated in FIG. 1. The print head 1 is disposed facing the photoconductive drum 17.

The photoconductive drum 17 rotates in a direction of an arrow illustrated in FIG. 1. The rotation direction of the photoconductive drum 17 will be referred to as "sub-scanning direction", and a direction perpendicular to the sub-scanning direction will be referred to as "main scanning direction". The photoconductive drum 17 is uniformly charged by a charging unit and is exposed to light emitted from the print head 1 such that the potential of the exposed portion decreases. That is, the image forming apparatus controls the emission of the print head 1 and forms an electrostatic latent image on the photoconductive drum 17. By controlling the emission of the print head 1, a timing of the emission and extinction (non-emission) of the print head 1 is controlled.

The print head 1 includes a light emitting unit 10 and a rod lens array 12. The light emitting unit 10 includes a transparent substrate 11. For example, the transparent substrate 11 is a glass substrate that allows transmission of light. A plurality of light emitting element arrays 13 including a plurality of light emitting elements such as LEDs or OLEDs are formed on the transparent substrate 11.

As illustrated in FIG. 1, two arrays including a first light emitting element array 1301 and a second light emitting element array 1302 are arranged in parallel. The rod lens array 12 focuses light emitted from each of the light emitting elements 131 of the two arrays including the first light emitting element array 1301 and the second light emitting element array 1302 on the photoconductive drum 17. As a result, an image line corresponding to the emission of the light emitting elements 131 is formed on the photoconductive drum 17. In the description of the first and second embodiments, the print head 1 may include a plurality of light emitting element arrays 13. A case where the print head 1 includes the single light emitting element array 13, however, is also possible. In addition, the print head 1 includes a gap spacer 121. The gap spacer 121 keeps a predetermined distance between the transparent substrate 11 and the photoconductive drum 17.

Figure 2:
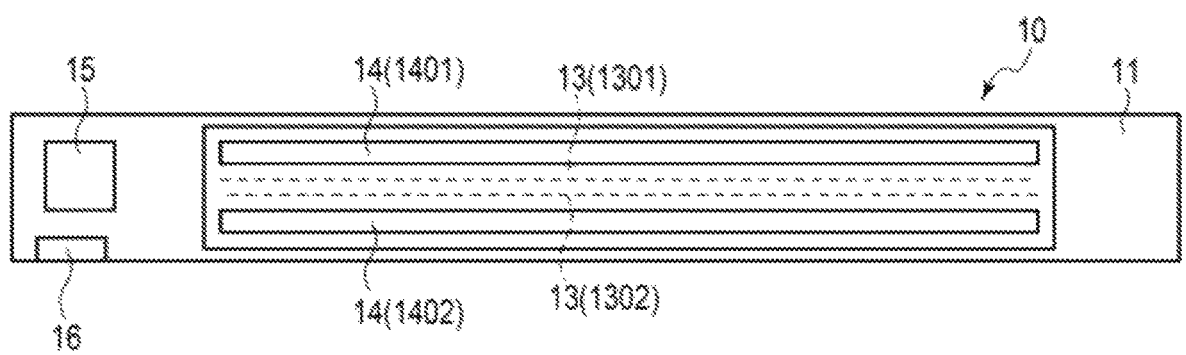
FIG. 2 is a diagram illustrating an example of a transparent substrate forming the print head according to the first and second embodiments.

FIG. 2 is a diagram illustrating an example of the transparent substrate forming the print head according to the first and second embodiments.

As illustrated in FIG. 2, the two light emitting element arrays 13 (the first light emitting element array 1301 and the second light emitting element array 1302) are formed at the center portion on the transparent substrate 11 in a longitudinal direction of the transparent substrate 11. In the vicinity of the light emitting element arrays 13, drive circuit arrays 14 (a first drive circuit array 1401 and a second drive circuit array 1402) are formed to drive (emit light) from the respective light emitting elements. Hereinafter, "drive" will be referred to as "DRV". In FIG. 2, the DRV circuit arrays for driving (emitting light) from the light emitting elements are disposed on both sides of the two light emitting element arrays 13. The DRV circuit array 14 may be disposed on a single side of the two light emitting element arrays 13, however.

An integrated circuit (IC) 15 is disposed at an end portion of the transparent substrate 11. In addition, the transparent substrate 11 includes a connector 16. The connector 16 electrically connects the print head 1 and a control system of a printer, a copying machine, or a multi-function peripheral. This connection enables power supply, head control, image data transfer, and the like. A substrate for sealing the light emitting element array 13, the DRV circuit array 14, and the like to prevent contact with outside air is attached to the transparent substrate 11. When it is difficult to mount the connector on the transparent substrate, a flexible printed circuit (FPC) may be connected to the transparent substrate for electrical connection to the control system in at least one embodiment.

Figure 3:
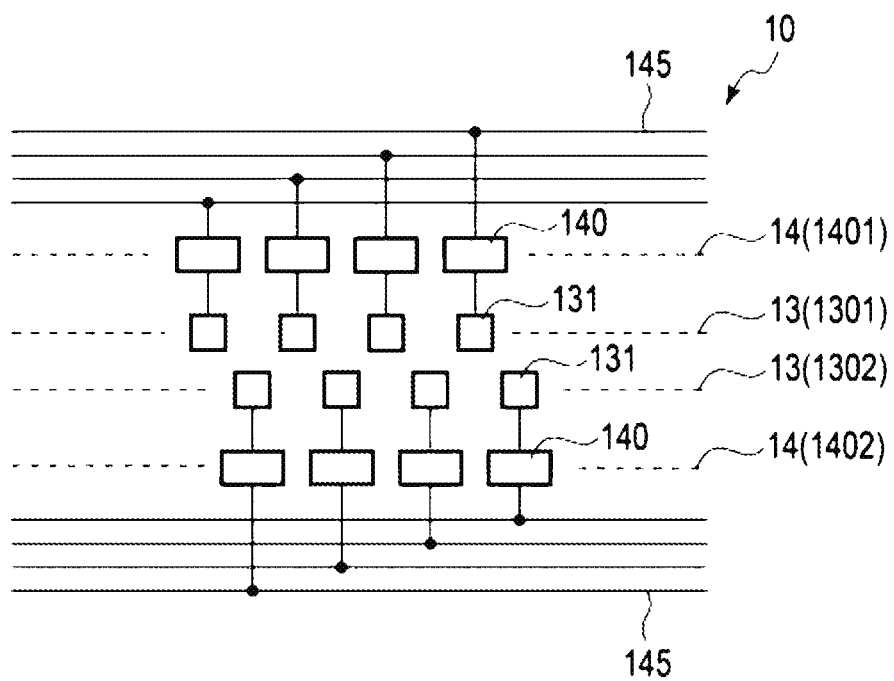
FIG. 3 is a diagram illustrating an example of a layout of light emitting elements and drive circuits in the print head according to the first and second embodiments.

FIG. 3 is a diagram illustrating an example of a layout of the light emitting elements and the drive circuits in the print head according to the first and second embodiments.

As illustrated in FIG. 3, the light emitting unit 10 of the print head 1 includes the light emitting element arrays 13 in which the light emitting elements 131 are arranged and the drive circuit arrays 14 in which the drive circuits 140 are arranged. The drive circuits 140 drive the light emitting elements 131 to emit light based on signals of wirings 145 (corresponding to a sample/hold signal 21, an emission level signal 22, an emission ON signal 26, and an emission OFF signal 27, which are described below).

Figure 4:
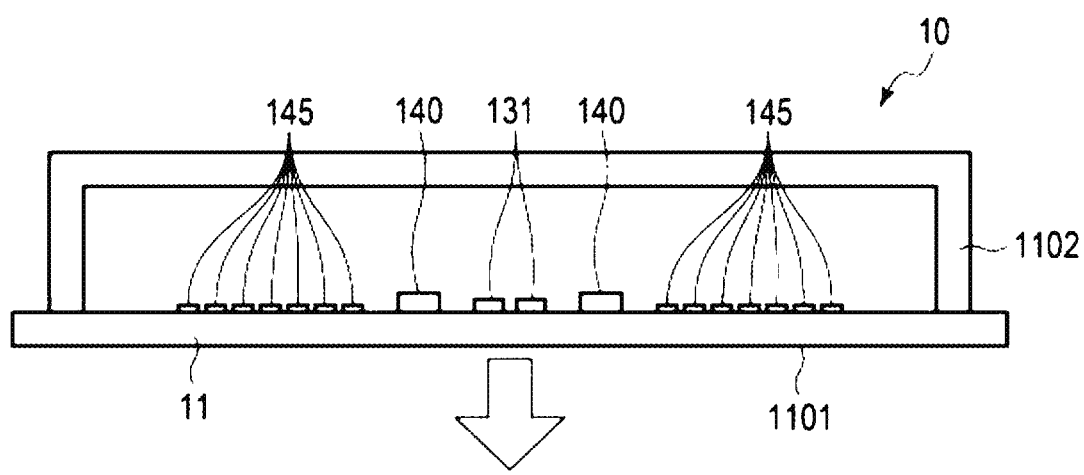
FIG. 4 is a diagram illustrating an example of a cross-section of the transparent substrate in the print head according to the first and second embodiments.

FIG. 4 is a diagram illustrating an example of a cross-section of the transparent substrate in the print head according to the first and second embodiments.

As illustrated in FIG. 4, the light emitting unit 10 of the print head 1 includes the light emitting elements 131, the drive circuits 140, and the wirings 145 that are disposed to face a reference surface 1101 of the transparent substrate 11. In addition, the light emitting unit 10 includes a sealing glass 1102. In a space surrounded by the transparent substrate 11 and the sealing glass 1102, the light emitting elements 131, the drive circuits 140, and the wirings 145 are disposed. Light emitted from the light emitting elements 131 passes through the transparent substrate 11 and is emitted to the photoconductive drum 17.

Figure 5:
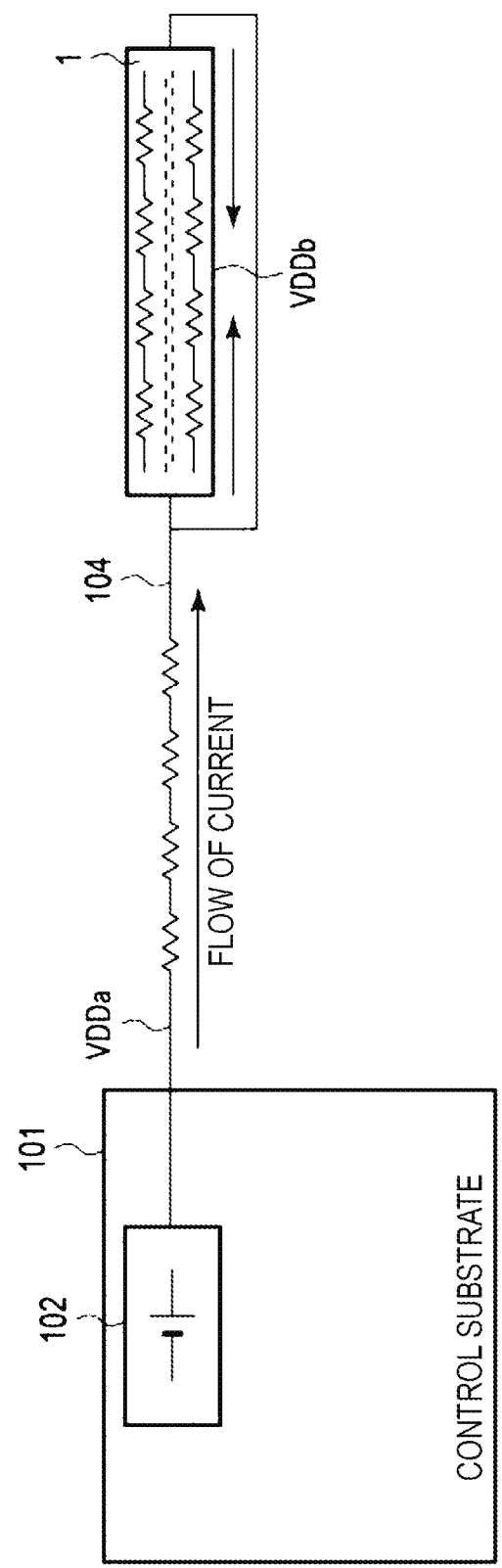
FIG. 5 is a diagram illustrating an example of a connection between a control substrate and the print head according to the first and second embodiments.

FIG. 5 is a diagram illustrating an example of a connection between a control substrate and the print head according to the first and second embodiments.

As illustrated in FIG. 5, the image forming apparatus includes a control substrate 101, and the control substrate 101 includes a power supply unit 102. The power supply unit 102 supplies a power supply voltage VDDa to both ends of the print head 1 through a harness 104. A relationship between the number of the light emitting elements 131 that emit light and a light intensity decrease ratio will be described below.

Figure 6:
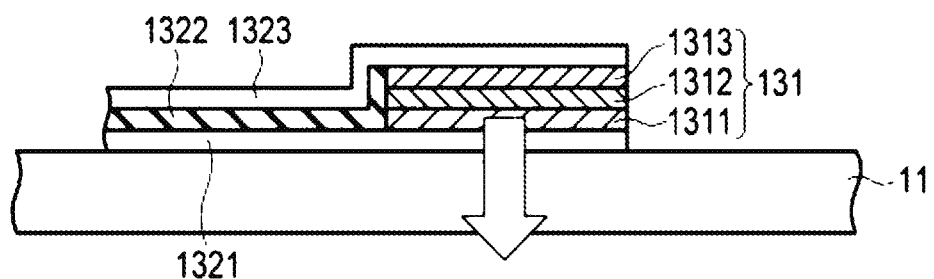
FIG. 6 is a diagram illustrating an example of a structure of the light emitting element in the print head according to the first and second embodiments.

FIG. 6 is a diagram illustrating an example of a structure of the light emitting element in the print head according to the first and second embodiments. FIG. 6 does not illustrate the sealing glass 1102.

For example, the light emitting element 131 is an organic electroluminescence (EL). As illustrated in FIG. 6, the light emitting element 131 includes a hole transport layer 1311, an emission layer 1312, an electron transport layer 1313 and is adjacent to and interposed between an electrode (+) 1321 and an electrode (−) 1323 insulated by an insulating layer 1322. For example, the emission layer 1312 is an organic EL. The electrode (−) 1323 has a structure that reflects light emitted from the emission layer 1312. Due to this structure, the light emitted from the emission layer 1312 is output to the transparent substrate 11 side.

Figure 7:
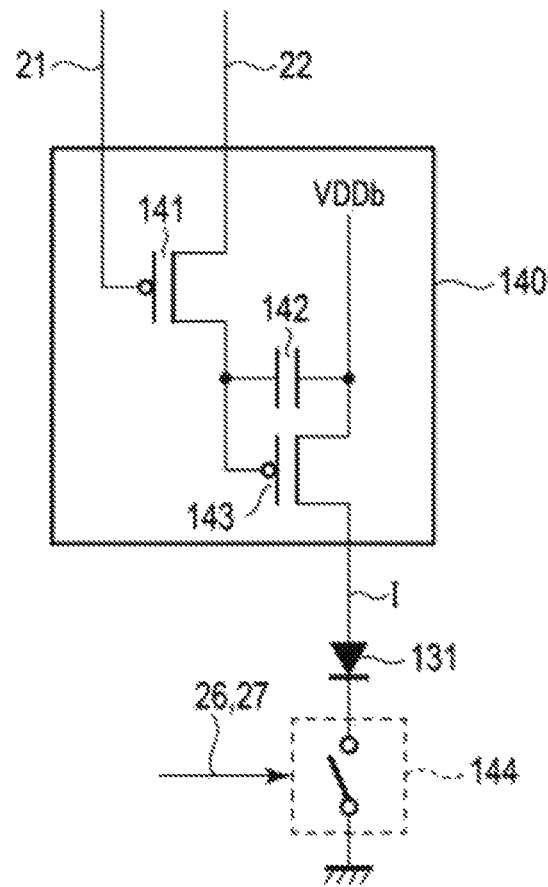
FIG. 7 is a diagram illustrating an example of a circuit configuration including a DRV circuit for driving the light emitting element according to the first and second embodiments, a light emitting element that is driven by the DRV circuit to emit light, and a switch that switches the supply of a current to the light emitting element.

FIG. 7 is a diagram illustrating an example of a circuit configuration including a DRV circuit for driving the light emitting element according to the first and second embodiments, a light emitting element that is driven by the DRV circuit to emit light, and a switch that switches the supply of a current to the light emitting element.

The DRV circuit may be configured with a low-temperature polysilicon thin film transistor (TFT). The sample/hold signal 21 is "L" level when the emission intensity of the light emitting element 131 connected to the DRV circuit 140 changes. When the sample/hold signal 21 is "L" level, the voltage of a capacitor 142 changes depending on the voltage of the emission level signal 22. That is, the capacitor 142 stores a potential that changes depending on correction data described below.

When the sample/hold signal 21 is "H", the voltage of the capacitor 142 is stored. Even when the voltage of the emission level signal 22 changes, the voltage level of the capacitor 142 does not change. A current corresponding to the voltage stored in the capacitor 142 flows through the light emitting element 131 connected to a signal line I of the DRV circuit 140. That is, the light emitting element 131 emits light according to the potential of the capacitor. Based on the sample/hold signal 21, a predetermined light emitting element 131 is selected from the light emitting elements 131 in the light emitting element array 13. Based on the emission level signal 22, the emission intensity is determined and can be maintained.

In addition, a switch 144 is connected to the DRV circuit 140. The switch 144 switches between the supply and the non-supply of a current (ON and OFF of the supply of a current) to the light emitting element 131. When the switch 144 is closed based on the emission ON signal 26, a current flows through the light emitting element 131 such that the light emitting element 131 emits light. When the switch 144 is opened based on the emission OFF signal 27, a current does not flow through the light emitting element 131 such that the light emitting element 131 stops emission.

Figure 8:
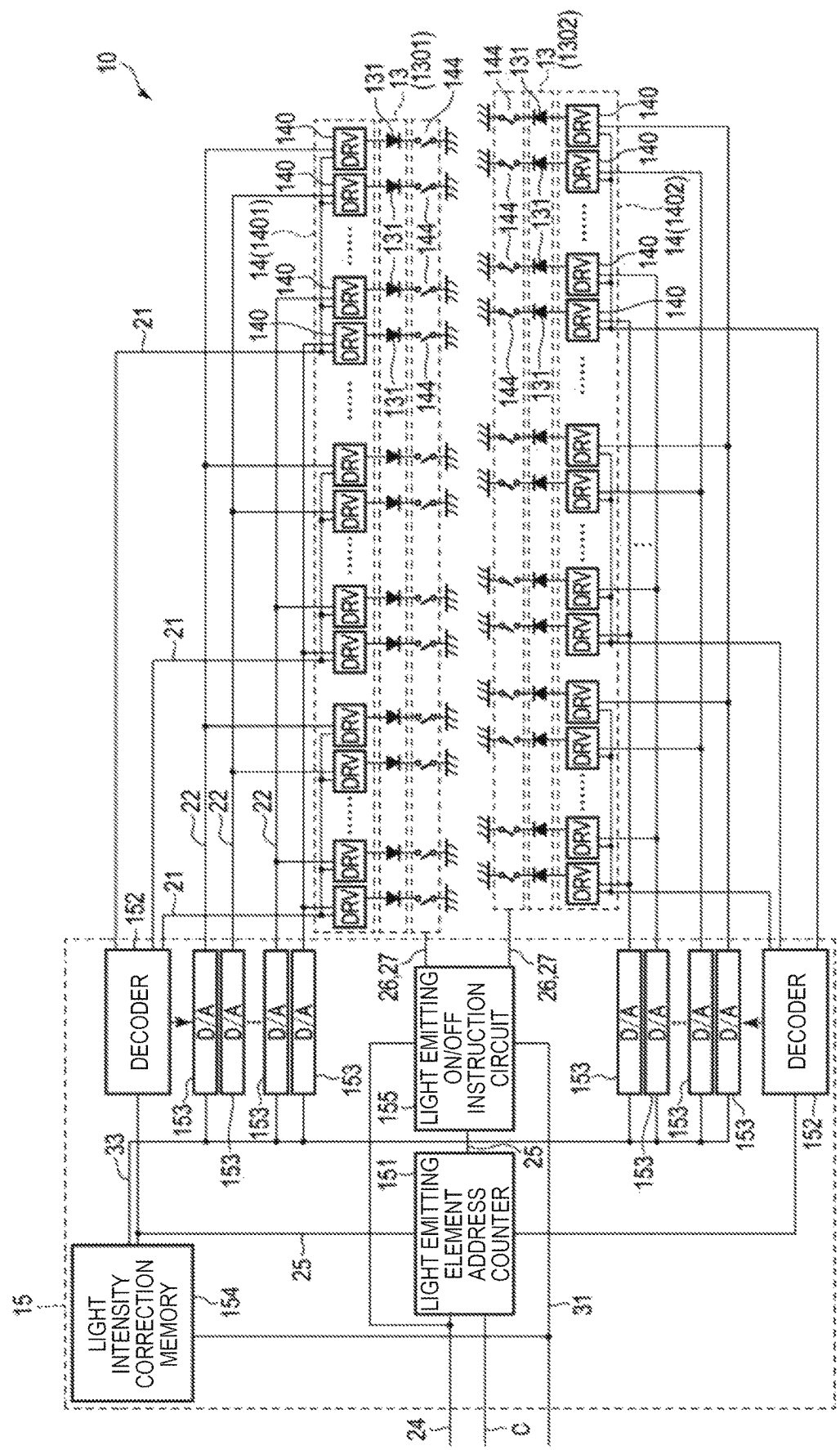
FIG. 8 is a diagram illustrating an example of a head circuit block in the print head according to the first and second embodiments.

FIG. 8 is a diagram illustrating an example of a head circuit block in the print head according to the first and second embodiments.

As illustrated in FIG. 8, the light emitting unit 10 includes a head circuit block including the IC 15. The IC 15 includes a light emitting element address counter 151, a decoder 152, a digital to analog (D/A) converter circuit 153, a light intensity correction memory 154, an emission ON/OFF instruction circuit 155, and the like. The light emitting element address counter 151, the decoder 152, the D/A converter circuit 153, the light intensity correction memory 154, and the emission ON/OFF instruction circuit 155 supply the sample/hold signal 21, the emission level signal 22, the emission ON signal 26, and the emission OFF signal 27 described above to the DRV circuit 140 and the like.

As illustrated in FIG. 8, the light emitting elements 131 are connected to the DRV circuits 140, respectively. The individual DRV circuits 140 supply individual currents to the individual light emitting elements 131, respectively. The D/A converter circuit 153 is connected to the first DRV circuit array 1401 connected to the first light emitting element array 1301. Likewise, the D/A converter circuit 153 is connected to the DRV circuit array 1402 connected to the second light emitting element array 1302.

The light intensity correction memory 154 stores correction data corresponding to a current flowing through each of the light emitting elements 131. A horizontal synchronization signal 24 and an image data write clock C are input to the light emitting element address counter 151 through the connector 16. The horizontal synchronization signal 24 resets a count value of the light emitting element address counter 151. The light emitting element address counter 151 outputs a light emitting element address signal 25 synchronized with the image data write clock C.

The image data 31 and the light emitting element address signal 25 output from the light emitting element address counter 151 are input to the light intensity correction memory 154. The light emitting element address signal 25 output from the light emitting element address counter 151 is input to the decoder 152. The decoder 152 outputs the sample/hold signal 21 corresponding to the light emitting element 131 designated by the light emitting element address signal 25. The light intensity correction memory 154 outputs correction data 33 corresponding to the light emitting element 131 designated by the light emitting element address signal 25. The correction data 33 output from the light intensity correction memory 154 is input to the D/A converter circuit 153. The D/A converter circuit 153 outputs a voltage of the emission level signal 22 based on the correction data 33. The voltage of the emission level signal 22 is sampled and held in the capacitor 142 of the DRV circuit 140. The sampling and holding in the capacitor 142 is periodically performed.

First and Second Embodiments: Configuration of Image Forming Apparatus

Figure 9:
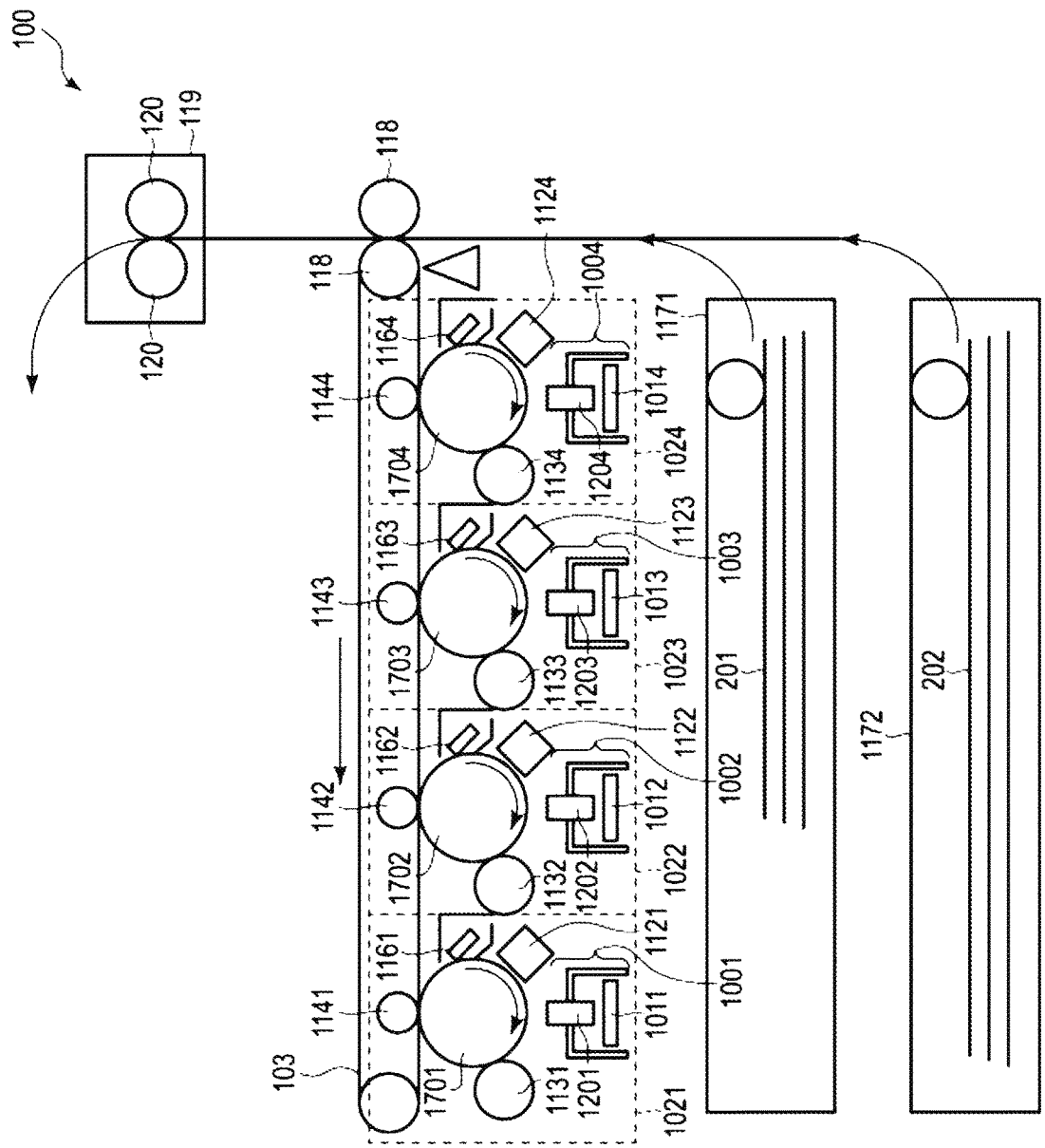
FIG. 9 is a diagram illustrating an example of an image forming apparatus to which the print head is applied according to the first and second embodiments.

FIG. 9 is a diagram illustrating an example of an image forming apparatus to which the print head according to the first and second embodiments is applied. FIG. 9 illustrates a quadruple-tandem type color image forming apparatus. However, the print head 1 is also applicable to a monochrome image forming apparatus.

As illustrated in FIG. 9, for example, an image forming apparatus 100 may include an image forming unit 1021 that forms a yellow (Y) image; an image forming unit 1022 that forms a magenta (N) image; an image forming unit 1023 that forms a cyan (C) image; and an image forming unit 1024 that forms a black (K) image. The image forming units 1021, 1022, 1023, and 1024 form yellow, cyan, magenta, and black images, respectively, and transfer the formed images to a transfer belt 103. As a result, a full-color image is formed on the transfer belt 103.

The image forming unit 1021 that forms a yellow (Y) image includes a print head 1001, and the print head 1001 includes a light emitting unit 1011 and a rod lens array 1201. Further, the image forming unit 1021 includes an electrostatic charger 1121, the print head 1001, a developing unit 1131, a transfer roller 1141, and a cleaner 1161 that are provided in the vicinity of a photoconductive drum 1701. The print head 1001 corresponds to the print head 1, the light emitting unit 1011 corresponds to the light emitting unit 10, the rod lens array 1201 corresponds to the rod lens array 12, the photoconductive drum 1701 corresponds to the photoconductive drum 17, and the description thereof will not be repeated for simplicity.

The image forming unit 1022 that forms a magenta (M) image includes a print head 1002, and the print head 1002 includes a light emitting unit 1012 and a rod lens array 1202. Further, the image forming unit 1022 includes an electrostatic charger 1122, the print head 1002, a developing unit 1132, a transfer roller 1142, and a cleaner 1162 that are provided in the vicinity of a photoconductive drum 1702. The print head 1002 corresponds to the print head 1, the light emitting unit 1012 corresponds to the light emitting unit 10, the rod lens array 1202 corresponds to the rod lens array 12, the photoconductive drum 1702 corresponds to the photoconductive drum 17, and the description thereof will not be repeated for simplicity.

The image forming unit 1023 that forms a cyan (C) image includes a print head 1003, and the print head 1003 includes a light emitting unit 1013 and a rod lens array 1203. Further, the image forming unit 1023 includes an electrostatic charger 1123, the print head 1003, a developing unit 1133, a transfer roller 1143, and a cleaner 1163 that are provided in the vicinity of a photoconductive drum 1703. The print head 1003 corresponds to the print head 1, the light emitting unit 1013 corresponds to the light emitting unit 10, the rod lens array 1203 corresponds to the rod lens array 12, the photoconductive drum 1703 corresponds to the photoconductive drum 17, and the description thereof will not be repeated for simplicity.

The image forming unit 1024 that forms a black (K) image includes a print head 1004, and the print head 1004 includes a light emitting unit 1014 and a rod lens array 1204. Further, the image forming unit 1024 includes an electrostatic charger 1124, the print head 1004, a developing unit 1134, a transfer roller 1144, and a cleaner 1164 that are provided in the vicinity of a photoconductive drum 1704. The print head 1004 corresponds to the print head 1, the light emitting unit 1014 corresponds to the light emitting unit 10, the rod lens array 1204 corresponds to the rod lens array 12, the photoconductive drum 1704 corresponds to the photoconductive drum 17, and the description thereof will not be repeated for simplicity.

The electrostatic chargers 1121, 1122, 1123, and 1124 uniformly charge the photoconductive drums 1701, 1702, 1703, and 1704, respectively. The print heads 1001, 1002, 1003, and 1004 expose the photoconductive drums 1701, 1702, 1703, and 1704 to light emitted from the light emitting elements 131 of the first light emitting element array 1301 and the second light emitting element array 1302 to form electrostatic latent images on the photoconductive drums 1701, 1702, 1703, and 1704, respectively. The developing unit 1131 attaches (develops) yellow toner, the developing unit 1132 attaches magenta toner, the developing unit 1133 attaches cyan toner, and the developing unit 1134 attaches black toner to electrostatic latent image portions of the photoconductive drums 1701, 1702, 1703, and 1704, respectively.

The transfer rollers 1141, 1142, 1143, and 1144 transfer the toner images developed on the photoconductive drums 1701, 1702, 1703, and 1704 to the transfer belt 103. The cleaners 1161, 1162, 1163, and 1164 clean the toners remaining on the photoconductive drums 1701, 1702, 1703, and 1704 without being transferred, and enter a sleep mode for forming the next image.

Paper (recording medium) 201 having a first size (small size) is accommodated in a paper cassette 1171 as a paper supply unit. Paper (recording medium) 202 having a second size (large size) is accommodated in a paper cassette 1172 as a paper supply unit.

The toner images are transferred from the transfer belt 103 to the paper 201 or 202 picked up from the paper cassette 1171 or 1172 using a transfer roller pair 118 as a transfer unit. The paper 201 or 202 to which the toner images are transferred is heated and pressed by a fixing roller 120 of a fixing unit 119. The toner images are firmly fixed to the paper 201 or 202 when heated and pressed by the fixing roller 120. By repeating the above-described process operation, an image forming operation is continuously executed.

First Embodiment: Configuration of Control System

Figure 10:
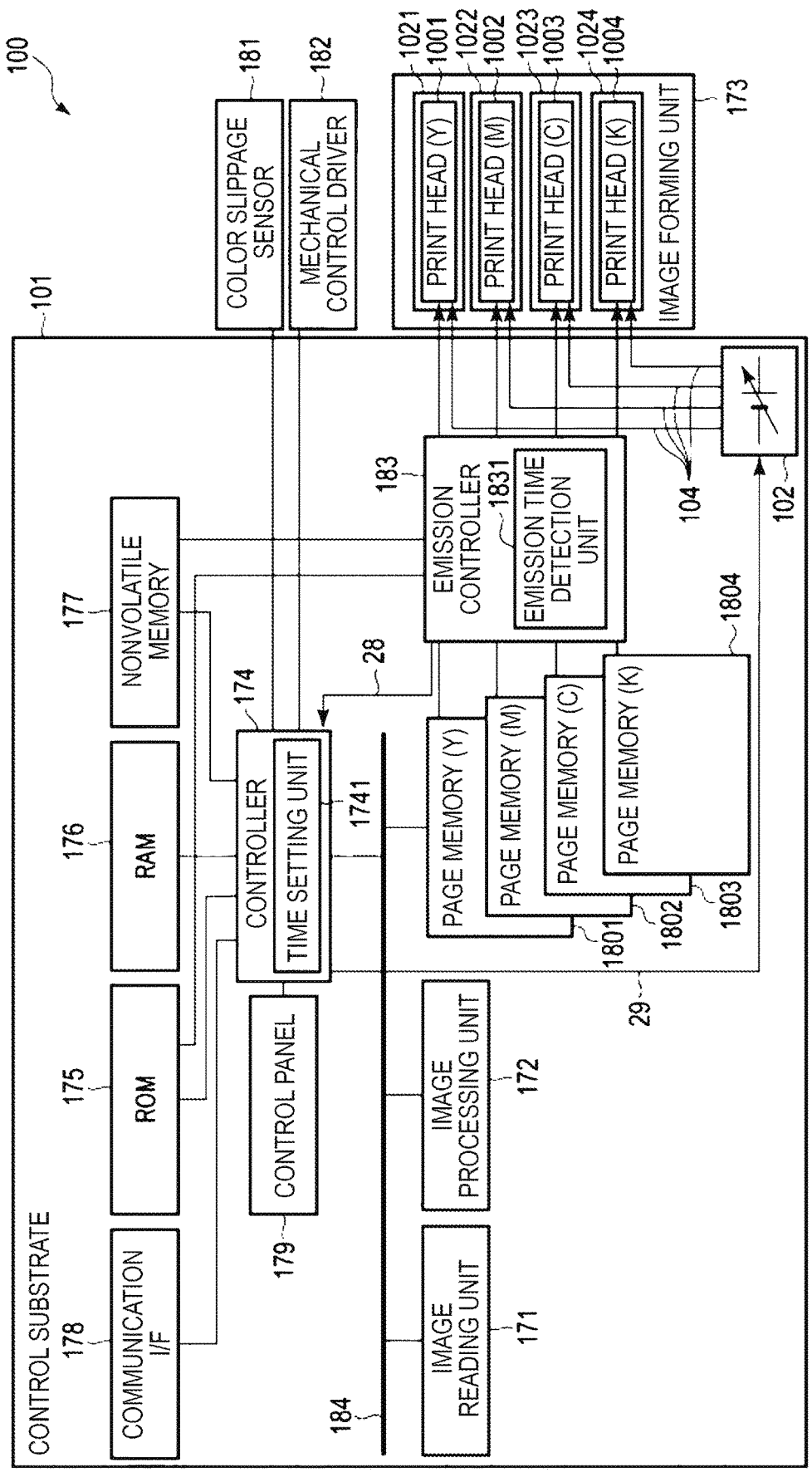
FIG. 10 is a block diagram illustrating an example of a control system of the image forming apparatus according to the first embodiment.

FIG. 10 is a block diagram illustrating an example of a control system of the image forming apparatus according to the first embodiment.

As illustrated in FIG. 10, the image forming apparatus 100 includes the control substrate 101. The control substrate 101 may include a power supply unit 102, an image reading unit 171, an image processing unit 172, an image forming unit 173, a controller 174, a read only memory (ROM) 175, a random-access memory (RAM) 176, a nonvolatile memory 177, a communication I/F 178, a control panel 179, page memories 1801, 1802, 1803, and 1804, an emission controller 183, and an image data bus 184. Further, the image forming apparatus 100 may include a color slippage sensor 181 and a mechanical control driver 182. The image forming unit 173 includes image forming units 1021, 1022, 1023, and 1024. The power supply unit 102 supplies a drive voltage to both ends of the print heads 1001, 1002, 1003, and 1004 of the image forming unit 173 through the harness 104.

The ROM 175, the RAM 176, the nonvolatile memory 177, the communication I/F 178, the control panel 179, the color slippage sensor 181, the mechanical control driver 182, and the emission controller 183 are connected to the controller 174.

The image reading unit 171, the image processing unit 172, the controller 174, and the page memories 1801, 1802, 1803, and 1804 are connected to the image data bus 184. Each of the page memories 1801, 1802, 1803, and 1804 outputs the image data 31 of Y, M, C, or K. The emission controller 183 is connected to the page memories 1801, 1802, 1803, and 1804, the image data 31 of Y is input from the page memory 1801, the image data 31 of M is input from the page memory 1802, the image data 31 of C is input from the page memory 1803, and the image data 31 of K is input from the page memory 1804. The print heads 1001, 1002, 1003, and 1004 are connected to the emission controller 183 according to the respective image data 31. The emission controller 183 inputs the respective image data 31 to the print heads 1001, 1002, 1003, and 1004 corresponding to the respective image data 31.

The controller 174 is configured with one or more processors and controls operations such as an image reading operation, an image processing operation, and an image forming operation in accordance with various programs stored in at least one of the ROM 175 and the nonvolatile memory 177.

In addition, the controller 174 inputs image data of test patterns to the page memories 1801, 1802, 1803, and 1804 to form the test patterns. The color slippage sensor 181 detects the test patterns formed on the transfer belt 103 and outputs a detection signal to the controller 174. The controller 174 can recognize a position relationship between the test patterns of the respective colors from the input of the color slippage sensor 181. The controller 174 selects the paper cassette 1171 or 1172 that feeds paper on which an image is to be formed through the mechanical control driver 182.

In addition, the controller 174 includes a time setting unit 1741. The time setting unit 1741 controls the number of prints per unit time based on a detection result of an emission time corresponding to image data. For example, the time setting unit 1741 controls a time interval from a print end corresponding to first image data to a print start corresponding to second image data following the first image data based on a detection result of an emission time corresponding to the first image data. When the light emitting element 131 emits light based on the first image data, the time setting unit 1741 controls the time interval to the print start corresponding to the second image data based on the longest emission time among the emission times detected for the light emitting elements 131. In the case of color printing, the time setting unit 1741 controls the time interval to the print start corresponding to the second image data based on the longest emission time among the emission times detected for the light emitting elements 131 in the print heads 1001, 1002, 1003, and 1004.

In the light emitting element 131, the light intensity decreases according to the emission time (characteristics of the thin film transistor (TFT) 143 provided in the DRV circuit 140 are predominant), and a decrease in light intensity during emission is recovered according to the non-emission time. That is, in the light emitting element 131, as the emission time increases, the light intensity decreases, and as the non-emission time increases, a decrease in light intensity during emission is recovered. By providing a non-emission time of a given time or longer to the light emitting element 131, a decrease in light intensity during emission can be sufficiently recovered. In order to prevent deterioration in image quality caused by the characteristics of the light emitting element 131 and the DRV circuit 140, the controller 174 controls the number of prints per unit time based on the emission time. In other words, when the emission time based on the first image data increases, the controller 174 delays the print start based on the second image data such that a decrease in the light intensity of the light emitting element 131 is recovered.

The ROM 175 stores various programs and the like required for the control of the controller 174. Various programs include an emission control program for the print head. The emission control program controls a timing of emission and extinction (non-emission) based on image data. In addition, various programs include a timing control program for controlling the number of prints per unit time. For example, the timing control program controls a time interval from a print end corresponding to first image data to a print start corresponding to second image data following the first image data based on a detection result of an emission time corresponding to the first image data.

The RAM 176 temporarily stores data required for the control of the controller 174. The nonvolatile memory 177 stores a part or all of various programs and various parameters and the like.

The mechanical control driver 182 controls operations of motors and the like required for printing in accordance with an instruction of the controller 174. The communication I/F 178 outputs various information to an external apparatus and inputs various information from an external apparatus. For example, the communication I/F 178 acquires image data including a plurality of image lines. The image forming apparatus 100 prints image data acquired through the communication I/F 178 using a print function. The control panel 179 receives an operation input from a user or a service person.

The image reading unit 171 optically reads an image of an original document to acquire image data including a plurality of image lines and outputs the image data to the image processing unit 172. The image processing unit 172 executes various kinds of image processing such as correction on the image data input through the communication I/F 178 or the image data input from the image reading unit 171. The page memories 1801, 1802, 1803, and 1804 store image data processed by the image processing unit 172. The controller 174 edits the image data on the page memories 1801, 1802, 1803, and 1804 to be suitable for a print position or the print head. The image forming unit 173 forms an image based on the image data stored in the page memories 1801, 1802, 1803, and 1804. That is, the image forming unit 173 forms an image based on the emission (the state of emission and extinction) of each of the light emitting elements 131 corresponding to the image data.

The emission controller 183 is configured with one or more processors and controls the emission of the light emitting element 131 based on the image data in accordance with various programs stored in at least one of the RON 175 and the nonvolatile memory 177. The emission controller 183 may include an emission time detection unit 1831.

The emission time detection unit 1831 detects the emission time of the print head 1 that emits according to the image data and notifies emission time information 28 to the controller 174. That is, the emission time detection unit 1831 detects the emission time of the print head 1 that emits light to print a first image (an image corresponding to one page) based on the image data. For example, the emission time detection unit 1831 detects the emission time based on the image data for each of the light emitting element 131 and outputs the longest emission time as the detection result. In the case of color printing, the emission time detection unit 1831 detects the emission time based on the image data for each of the light emitting element 131 in the print heads 1001, 1002, 1003, and 1004 and outputs the longest emission time as the detection result.

First Embodiment: Control of Time Interval to Print Start

Figure 11:
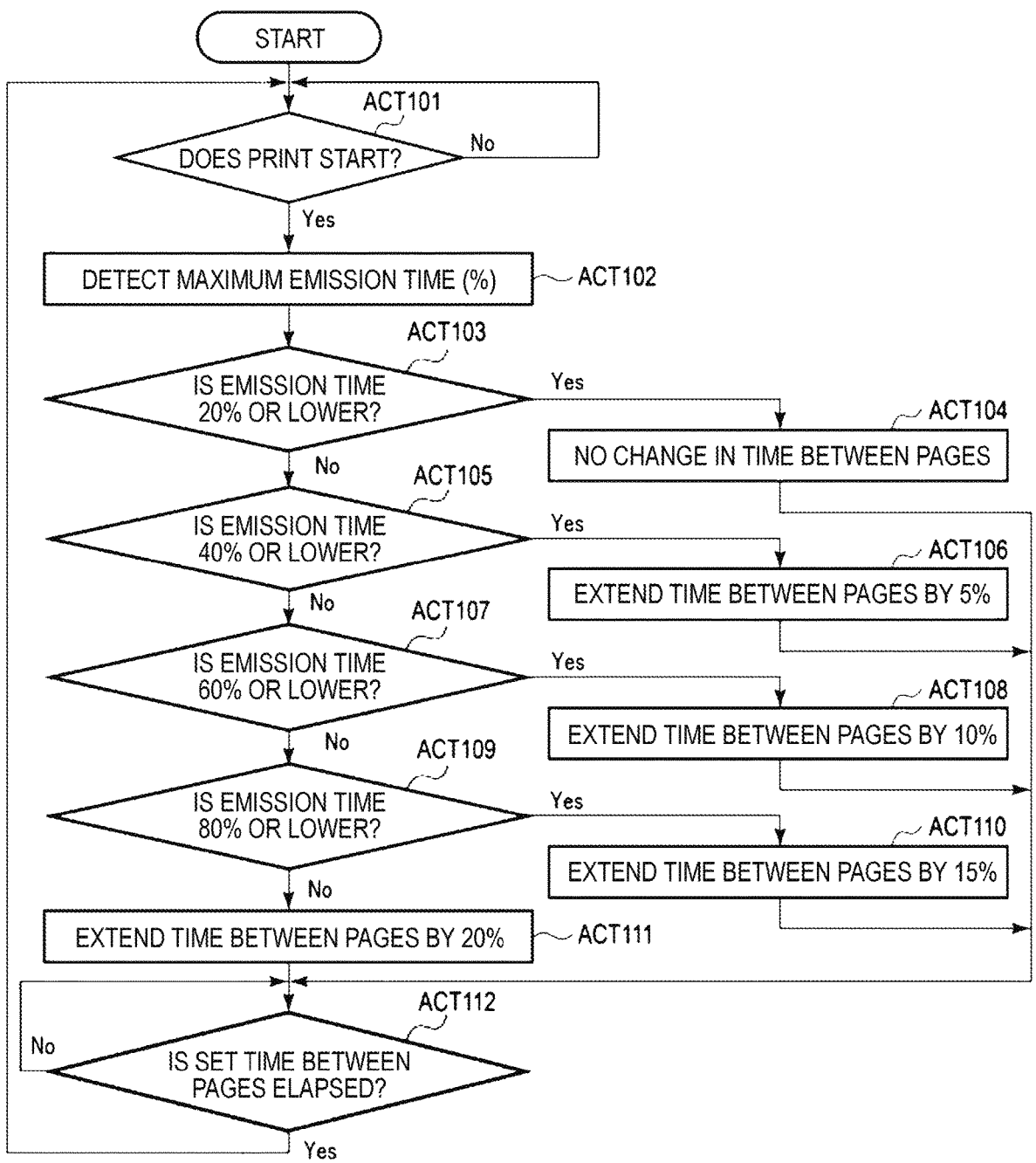
FIG. 11 is a flowchart illustrating an example of a control of a time interval to a print start that is executed by the image forming apparatus according to the first embodiment.

FIG. 11 is a flowchart illustrating an example of a control of a time interval to a print start that is executed by the image forming apparatus according to the first embodiment.

The communication interface 178 receives the first image data and the second image data following the first image data and outputs the received first and second image data. Alternatively, the image reading unit 171 reads a first document image and a second document image following the first document image, and outputs the read first and second image data. In the case of continuous printing or continuous copying, the first image data and the second image data may be the same.

At a predetermined timing, the controller 174 instructs to start conveying the paper 201 or 202 to which the first image, based on the first image data, is to be transferred. In addition, the controller 174 sets a reference current value (voltage value) 29 that is supplied from the power supply unit 102 to the print heads 1001, 1002, 1003, and 1004. The paper 201 or 202 accommodated in the paper cassette 1171 or 1172 is conveyed to the image forming units 1021, 1022, 1023, and 1024. The image forming units 1021, 1022, 1023, and 1024 detect the conveyed paper and print the first image based on the first image data on the conveyed paper 201 or 202 based on the timing at which the paper is detected (ACT 101, YES).

For example, when the first image data corresponding to respective colors is received (that is, in the case of color printing), the image processing unit 172 may convert the first image data corresponding to the respective colors into raster data, and loads the converted raster data to the page memories 1801, 1802, 1803, and 1804. The page memories 1801, 1802, 1803, and 1804 output the first image data. The print heads 1001, 1002, 1003, and 1004 emit light based on the first image data and print the first image based on the first image data on the paper 201 or 202.

The emission time detection unit 1831 detects the emission times of the print heads 1001, 1002, 1003, and 1004 that emit light according to the first image data and notifies emission time information 28 to the controller 174 (ACT 102).

The emission time detection unit 1831 detects the emission times of the light emitting elements 131 in the print head 1001 based on the first image data, and detects the longest emission time among the detected emission times as the emission time of the print head 1001. Likewise, for the print heads 1002, 1003, and 1004, similarly, the emission time detection unit 1831 detects the emission times of the light emitting elements 131 in each of the print heads based on the first image data, and detects the longest emission time among the detected emission times as the emission time of each of the print heads. Further, the emission time detection unit 1831 detects the longest emission time among the emission times of the print heads 1001, 1002, 1003, and 1004 as the emission time corresponding to the first image data.

The light emitting element 131 emits light according to the first image data, and when the light emitting element 131 emits light over the all the periods in the sub-scanning direction according to the first image data (image data corresponding to one page), it can be said that the emission time is 100%. That is, when the emission time of at least one of the light emitting elements in the print heads 1001, 1002, 1003, and 1004 is 100%, the emission time detection unit 1831 detects the emission time corresponding to the first image data as 100%. In addition, when the longest emission time among the emission times of all the light emitting elements in the print heads 1001, 1002, 1003, and 1004 is 80%, the emission time detection unit 1831 detects the emission time corresponding to the first image data as 80%.

In addition, the time setting unit 1741 of the controller 174 controls a time interval (time between pages) to a print start corresponding to second image data following first image data based on the detection result of the emission time corresponding to the first image data (ACT 103 to ACT 111). For example, when the emission time corresponding to the first image data exceeds a reference time, the time setting unit 1741 extends the time interval to the print start corresponding to the second image data. For example, when the emission time corresponding to the first image data exceeds the reference time, the controller 174 delays a timing at which a recording medium starts to be conveyed to print a second image corresponding to the second image data to be later than a reference timing. In addition, the time setting unit 1741 may control a time interval from an emission end corresponding to the first image data to an emission start corresponding to the second image data based on the detection result of the emission time corresponding to the first image data.

For example, when the emission time corresponding to the first image data is lower than or equal to 20% (first ratio) (ACT 103, YES), the time setting unit 1741 sets (maintains) the reference time without changing the time between paces for the printing of the first image based on the first image data and the printing of the second image based on the second image data (ACT 104).

When the emission time corresponding to the first image data is higher than 20% (ACT 103, NO) and 40% (second ratio) or lower (ACT 105, YES), the time setting unit 1741 sets the time between pages as a first time interval that is longer than the reference time by 5% (ACT 106).

When the emission time corresponding to the first image data is higher than 40% (ACT 105, NO) and 60% (third ratio) or lower (ACT 107, YES), the time setting unit 1741 sets the time between pages as a second time interval that is longer than the reference time by 10% (ACT 108).

When the emission time corresponding to the first image data is higher than 60% (ACT 107, NO) and 80% (fourth ratio) or lower (ACT 109, YES), the time setting unit 1741 sets the time between pages as a third time interval that is longer than the reference time by 15% (ACT 110).

When the emission time corresponding to the first image data is higher than 80% (ACT 109, NO), the time setting unit 1741 sets the time between pages as a fourth time interval that is longer than the reference time by 20% (ACT 111).

The controller 174 monitors the set time interval and, when the controller 174 detects that the set time interval is reached or elapsed (ACT 112, YES), starts printing based on the second image data (ACT 101). The controller 174 controls a timing at which the paper 201 or 202 starts to be conveyed based on the set time interval. That is, at a predetermined timing based on the set time interval, the controller 174 instructs the start of conveying the paper 201 or 202 to which the image based on the image data is to be transferred. The paper 201 or 202 accommodated in the paper cassette 1171 or 1172 is conveyed to the image forming unit 173. The image forming units 1021, 1022, 1023, and 1024 detect the conveyed paper and print the second image based on the second image data on the conveyed paper 201 or 202 based on the timing at which the paper is detected (ACT 101, YES). That is, the print heads 1001, 1002, 1003, and 1004 emit light based on the second image data, and print the second image corresponding to the second image data on the paper 201 or 202.

Second Embodiment: Configuration of Control System

Figure 12:
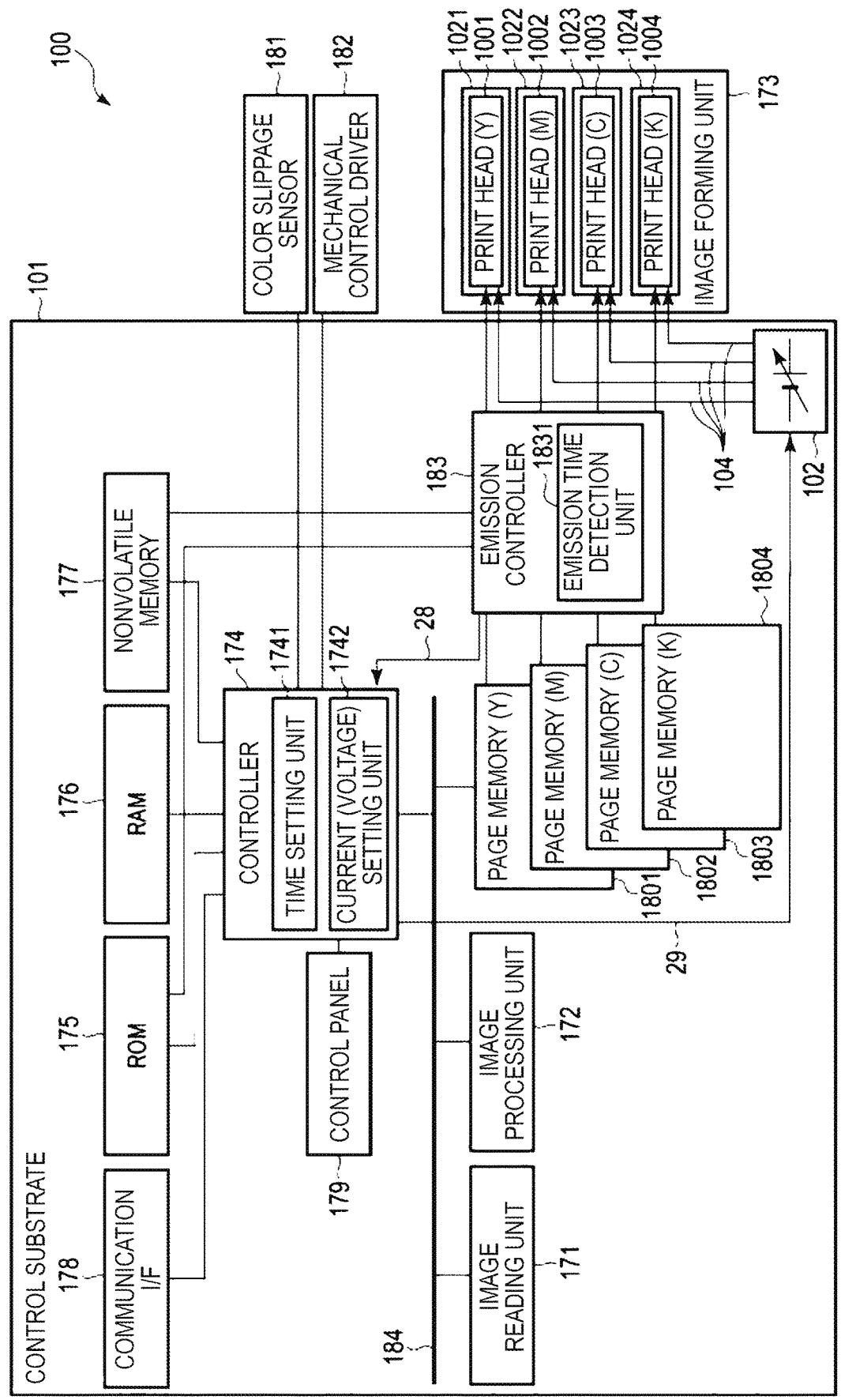
FIG. 12 is a block diagram illustrating an example of a control system of the image forming apparatus according to the second embodiment.

FIG. 12 is a block diagram illustrating an example of a control system of the image forming apparatus according to the second embodiment. Regarding the control system of the image forming apparatus according to the second embodiment, a difference from that of the control system of the image forming apparatus according to the first embodiment illustrated in FIG. 10 will be mainly described, and the description of the common features will be appropriately omitted.

As illustrated in FIG. 12, the image forming apparatus 100 includes a controller 174. The controller 174 includes the time setting unit 1741 and a current (voltage) setting unit 1742.

The current (voltage) setting unit 1742 sets a current value (voltage value) 29 that is supplied from the power supply unit 102 to the print heads 1001, 1002, 1003, and 1004. For example, the current setting unit 1742 selects any one of a reference current value, a first current value that is higher than the reference current value by 5%, and a second current value that is higher than the reference current value by 10%, and sets the selected current value. For example, the current setting unit 1742 sets the current value based on the printing result of the test pattern. For example, the light emitting element 131 decreases the light intensity according to a cumulative emission time. The current setting unit 1742 detects or estimates the decrease in light intensity and changes the reference current value to the first or second current value in order to suppress the influence of the decrease in light intensity.

The time setting unit 1741 controls the number of prints per unit time based on a detection result of an emission time corresponding to image data and the set current value (or voltage value). For example, the time setting unit 1741 controls a time interval from a print end corresponding to first image data to a print start corresponding to second image data following the first image data based on a detection result of an emission time corresponding to the first image data and the set current value. Further, the time setting unit 1741 controls a time interval to a print start corresponding to the second image data based on the longest emission time among the emission times detected for the light emitting elements and the set current value. In the case of color printing, the time setting unit 1741 controls the time interval to the print start corresponding to the second image data based on the longest emission time among the emission times detected for the light emitting elements in the print heads 1001, 1002, 1003, and 1004 and the set current value.

When the light intensity corresponding to the emission time decreases, the light emitting element 131 increases the light intensity decrease ratio corresponding to the emission time as the current value increases. In addition, in the light emitting element 131, a decrease in light intensity during emission is recovered according to the non-emission time. As the current value increases, however, the light intensity decrease ratio corresponding to the emission time increases. Therefore, as the current value increases, the non-emission time required to recover the light intensity increases. By maintaining a non-emission time of a given time or longer after emission in the light emitting element 131, a decrease in light intensity during emission can be completely recovered. In order to prevent deterioration in image quality caused by the characteristics of the light emitting element 131, the controller 174 controls the number of prints per unit time based on the emission time and the current value.

The nonvolatile memory 177 stores a time setting table applied to a control of a time interval to a print start. The controller 174 controls the number of prints per unit time based on data regarding a relationship between an emission time and a current value that is registered in the time setting table.

FIG. 13 is a diagram illustrating an example of a time setting table applied to a control of a time interval to a print start that is executed by the image forming apparatus according to the second embodiment.

As illustrated in FIG. 13, the time setting table includes data regarding a relationship between an emission time and a current value. When the light emitting element 131 emits light over the all the periods in the sub-scanning direction according to the image data corresponding to one page, the emission time is 100%. When the reference current is supplied and the maximum emission time is 20% or lower, the time setting unit 1741 sets (maintains) the reference time based on the time setting table without changing the time setting. In addition, when the first current, that is higher than the reference current by 5%, is supplied and the maximum emission time is 20% or lower, the time setting unit 1741 sets the time setting as a time interval that is longer than the reference time by 5% based on the time setting table. In addition, when the second current that is higher than the reference current by 10% is supplied and the maximum emission time is 20% or lower, the time setting unit 1741 sets the time setting as a time interval that is longer than the reference time by 10% based on the time setting table.

In addition, when the reference current is supplied and the maximum emission time is higher than 20% and 40% or lower, the time setting unit 1741 sets the time setting as a time interval that is longer than the reference time by 5% based on the time setting table. In addition, when the first current is supplied and the maximum emission time is higher than 20% and 40% or lower, the time setting unit 1741 sets the time setting as a time interval that is longer than the reference time by 10% based on the time setting table. In addition, when the second current is supplied and the maximum emission time is higher than 20%, and is 40% or lower, the time setting unit 1741 sets the time setting as a time interval that is longer than the reference time by 15% based on the time setting table.

In addition, when the reference current, the first current, or the second current is supplied and the maximum emission time is higher than 40%, and is 60% or lower, is higher than 60%, and is 80% or lower, or is higher than 80%, The time setting unit 1741 sets a predetermined time interval based on the time setting table.

Second Embodiment: Control of Time Interval to Print Start

Figure 14:
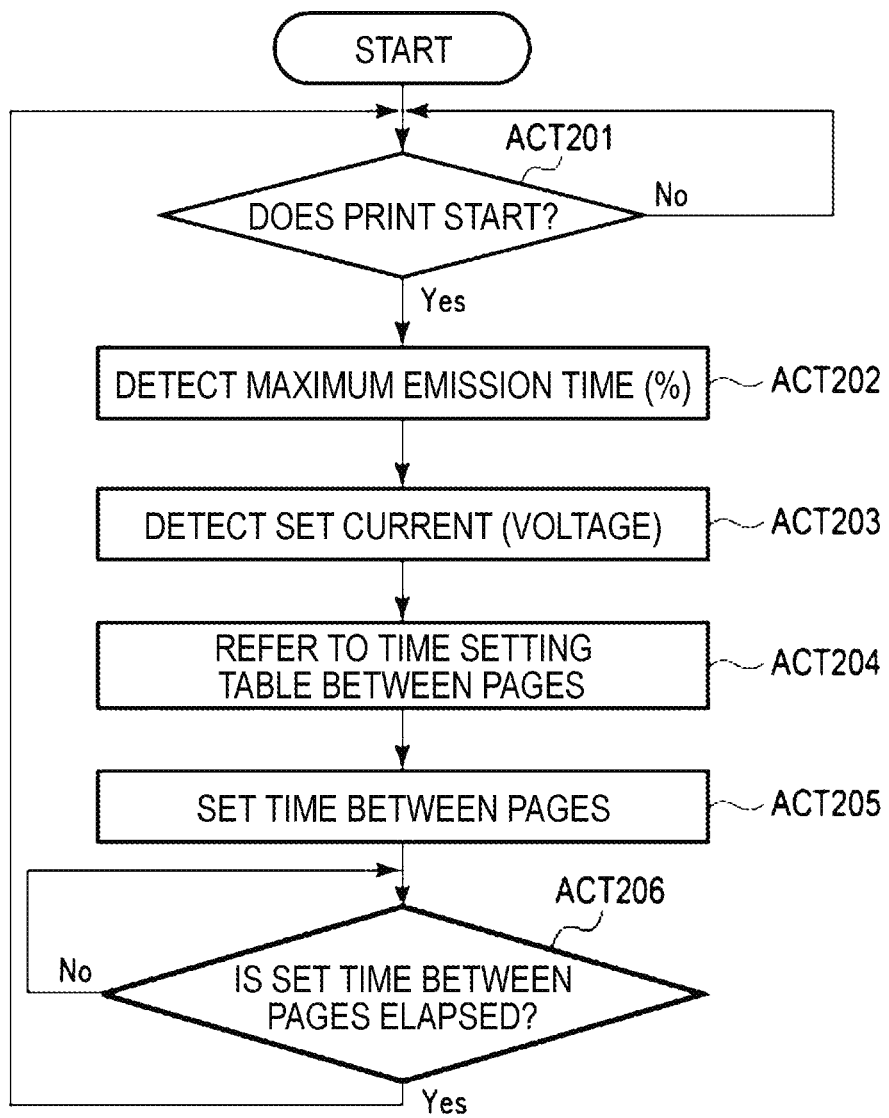
FIG. 14 is a flowchart illustrating an example of a control of a time interval to a print start that is executed by the image forming apparatus according to the second embodiment.

FIG. 14 is a flowchart illustrating an example of a control of a time interval to a print start that is executed by the image forming apparatus according to the second embodiment. Regarding the control of the time interval to the print start that is executed by the image forming apparatus according to the second embodiment, a difference from that of the time control of the time interval illustrated in FIG. 12 will be mainly described, and the description of the common features will be appropriately omitted.

At a predetermined timing, the controller 174 instructs the start of conveying the paper 201 or 202 to which the first image based on the first image data is to be transferred. In addition, the current setting unit 1742 of the controller 174 sets a reference current value (reference voltage value) 29 that is supplied from the power supply unit 102 to the print heads 1001, 1002, 1003, and 1004. The paper 201 or 202 accommodated in the paper cassette 1171 or 1172 is conveyed to the image forming units 1021, 1022, 1023, and 1024. The image forming units 1021, 1022, 1023, and 1024 detect the conveyed paper and print the first image based on the first image data on the conveyed paper 201 or 202 based on the timing at which the paper is detected (ACT 201, YES). The emission time detection unit 1831 detects the emission times of the print heads 1001, 1002, 1003, and 1004 that emit light according to the first image data and notifies emission time information 28 to the controller 174 (ACT 202). For example, the emission time detection unit 1831 detects the emission times of the light emitting elements 131 in the print heads 1001, 1002, 1003, and 1004 based on the first image data, and sets the longest emission time as the emission time corresponding to the first image data.

In addition, the current setting unit 1742 detects the set current value (reference current value) (ACT 203).

The time setting unit 1741 refers to data in the time setting table illustrated in FIG. 13 (ACT 204). The time setting unit 1741 controls the time interval (time between pages) to the print start corresponding to the second image data following the first image data based on the data in the time setting table and the detection results of the emission time corresponding to the first image data and the current value (ACT 205).

For example, when the reference current is supplied and the maximum emission time is 20% or lower, the time setting unit 1741 sets (maintains) the reference time without changing the time setting (ACT 205). In addition, when the first current that is higher than the reference current by 5% and the maximum emission time is 20% or lower, the time setting unit 1741 sets the time setting as a time interval that is longer than the reference time by 5% (ACT 205). In addition, when the second current that is higher than the reference current by 10% and the maximum emission time is 20% or lower, the time setting unit 1741 sets the time setting as a time interval that is longer than the reference time by 10% (ACT 205).

The controller 174 monitors the set time interval and, when the controller 174 detects that the set time interval is reached or elapsed (ACT 206, YES), starts printing based on the second image data (ACT 201). At a predetermined timing based on the set time interval, the controller 174 instructs the start of conveying the paper 201 or 202 to which the image based on the image data is to be transferred. The paper 201 or 202 accommodated in the paper cassette 1171 or 1172 is conveyed to the image forming unit 173. The image forming units 1021, 1022, 1023, and 1024 detect the conveyed paper and print the second image based on the second image data on the conveyed paper 201 or 202 based on the timing at which the paper is detected (ACT 201, YES).

Figure 15:
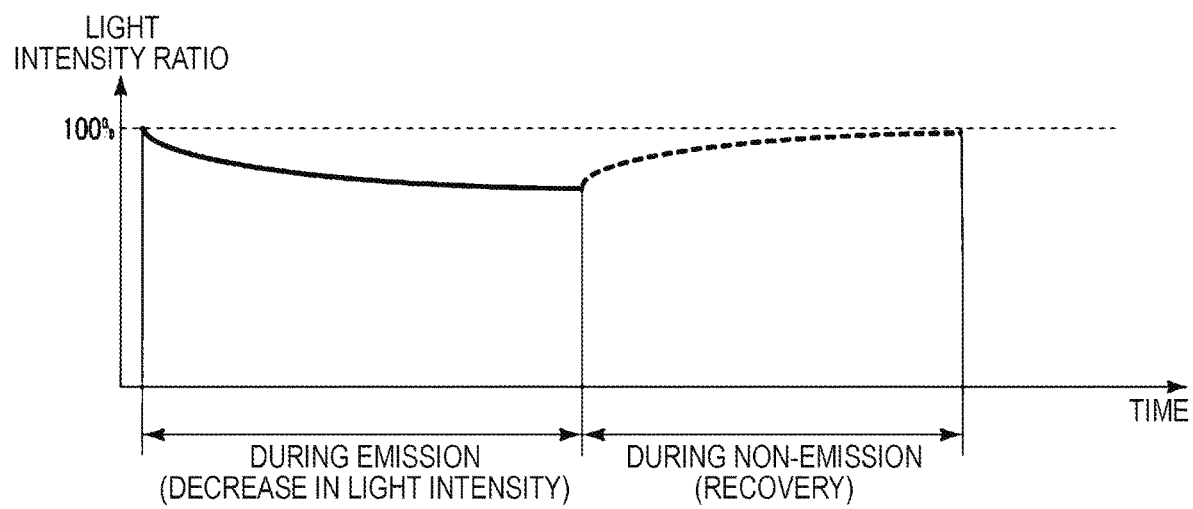
FIG. 15 is a diagram illustrating a relationship between a decrease in light intensity corresponding to an emission time of the light emitting element of the print head and light intensity decrease recovery characteristics, in which a relatively long emission time and a recovery time thereof are illustrated according to at least one embodiment.

FIG. 15 is a diagram illustrating a relationship between a decrease in light intensity corresponding to an emission time of the light emitting element of the print head and light intensity decrease recovery characteristics, in which a relatively long emission time (for example, the time corresponding to 100% in the sub-scanning direction of one page) and a recovery time thereof are illustrated. In addition, FIG. 16 is a diagram illustrating a relationship between a decrease in light intensity corresponding to an emission time of the light emitting element of the print head and light intensity decrease recovery characteristics, in which a relatively short emission time (for example, the time corresponding to 60% in the sub-scanning direction of one page) and a recovery time thereof are illustrated.

Figure 16:
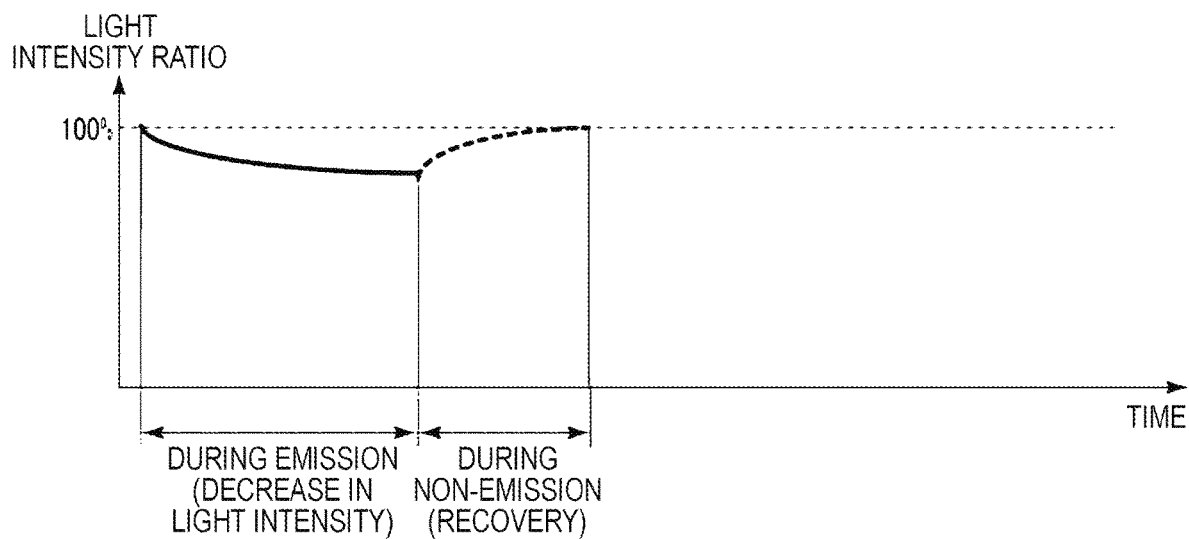
FIG. 16 is a diagram illustrating a relationship between a decrease in light intensity and light intensity decrease recovery characteristics depending on an emission time of the light emitting element of the print head, in which a relatively short emission time and a recovery time thereof are illustrated according to at least one embodiment.

As illustrated in FIGS. 15 and 16, in the light emitting element 131, the light intensity decreases according to the emission time, and the light intensity during emission is recovered according to the non-emission time. A dotted line graph in FIGS. 15 and 16 illustrates the state of recovery. For example, as illustrated in FIG. 15, in the light emitting element 131, when the emission time is long, a decrease in light intensity is large, and a relatively long time is required until the light intensity is recovered. In addition, as illustrated in FIG. 16, in the light emitting element 131, when the emission time is short, a decrease in light intensity is small, and only a relatively short time is required until the light intensity is recovered.

Figure 17:
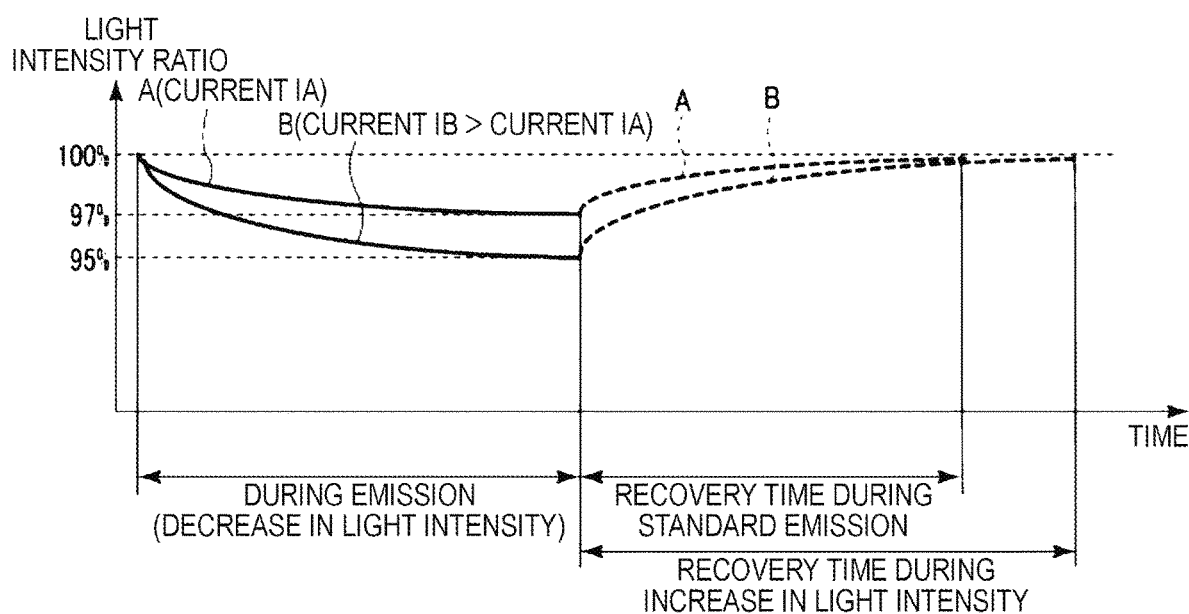
FIG. 17 is a diagram illustrating a relationship between a decrease in light intensity corresponding to an emission time and a current value of the light emitting element of the print head and light intensity decrease recovery characteristics according to at least one embodiment.

FIG. 17 is a diagram illustrating a relationship between a decrease in light intensity corresponding to an emission time and a current value of the light emitting element of the print head and light intensity decrease recovery characteristics. In FIG. 17, the vertical axis represents a light intensity ratio. The light intensity varies depending on a current flowing through the light emitting element 131. FIG. 17 illustrates a ratio of a change in light intensity with the passage of time with respect to 100% that is the light intensity ratio at the print start.

When the current supplied to the light emitting element 131 is a current IA as indicated by a curve A in FIG. 17, and the light emitting element 131 emits light for a relatively long emission time (for example, the time corresponding to 100% in the sub-scanning direction of one page), the light intensity decreases by about 3% (the light intensity ratio is 97%). The recovery time during standard emission is required until the light intensity is recovered to the value (100%) at the emission start. On the other hand, when the current supplied to the light emitting element 131 is, for example, a current IB that is higher than the current IA by 10% as indicated by a curve B in FIG. 17, and the light emitting element 131 emits light for a relatively long emission time (for example, the time corresponding to 100% in the sub-scanning direction of one page), the light intensity decreases by about 5% (the light intensity ratio is 95%). A recovery time during light intensity UP (for example, a time that is longer than the recovery time during standard emission by 10%) is required until the light intensity is recovered to the value (100%) at the emission start.

In this manner, when the current supplied to the light emitting element 131 increases, the light intensity of the light emitting element 131 increases, and the light intensity decrease ratio increases. When the light intensity decrease ratio increases, the time required for the recovery increases. When the current increases, a decrease in image quality can be prevented by increasing the recovery time.

Figure 18:
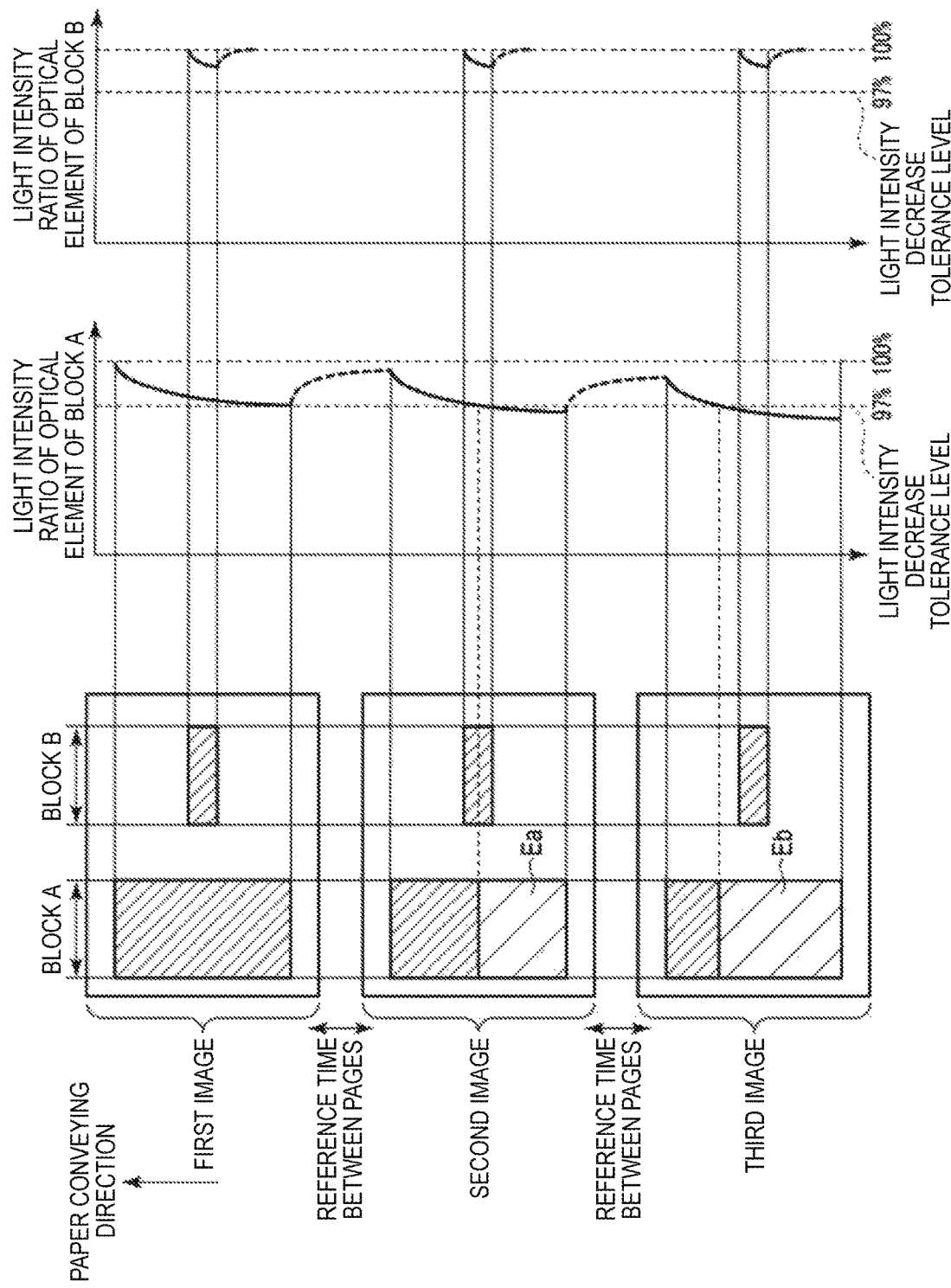
FIG. 18 is a diagram illustrating an example of an emission time of the light emitting element and the influence of a decrease in light intensity when a time interval control to a print start according to the first or second embodiment is not applied.

FIG. 18 is a diagram illustrating an example of an emission time of the light emitting element and the influence of a decrease in light intensity when a time interval control to a print start according to the first or second embodiment is not applied. In FIG. 18, the light intensity at the print start of the first image is set as 100%, and a light intensity decrease tolerance level is set as 3% (light intensity ratio: 97%). In the following description, the light intensity decrease tolerance level (light intensity ratio: 97%) will also be referred to as "reference (97%)".

As illustrated in FIG. 18, among the light emitting elements 131 in the print head 1, two sections corresponding to aggregations of predetermined numbers of light emitting elements 131 will be referred to as "block A" and "block B", respectively. For example, when the emission time of the block A is set as 100% (the light emitting element emits light over all the periods in the sub-scanning direction), the emission time of the block B is 20%. The emission time of the light emitting element 131 corresponding to the block A is long, and a decrease in light intensity is large. On the other hand, the emission time of the light emitting element 131 corresponding to the block B is short, and a decrease in light intensity is small.

At the print start of the first image, the light intensity of the light emitting element 131 corresponding to the block A is sufficient (100%). At the final stage of the printing of the first image, the light intensity of the light emitting element 131 corresponding to the block A satisfies the reference (97%) without being insufficient. In addition, at both the start and the final stage of the printing of the first image, the light intensity of the light emitting element 131 corresponding to the block B is sufficient (97% or higher). Even when the reference time interval (non-emission time) between pages is provided after printing the first image, the light intensity of the light emitting element 131 corresponding to the block A may be not be recovered sufficiently (100%). At the print start of the second image following the first image, the light intensity of the light emitting element 131 corresponding to the block A satisfies the reference (97% or higher). At the latter half of the printing of the second image, the light intensity of the light emitting element 131 corresponding to the block A may be slightly insufficient (lower than 97%) (refer to "light intensity insufficient area Ea"). In addition, at the start and the latter half of the printing of the second image, the light intensity of the light emitting element 131 corresponding to the block B is sufficient (97% or higher).

Figure 19:
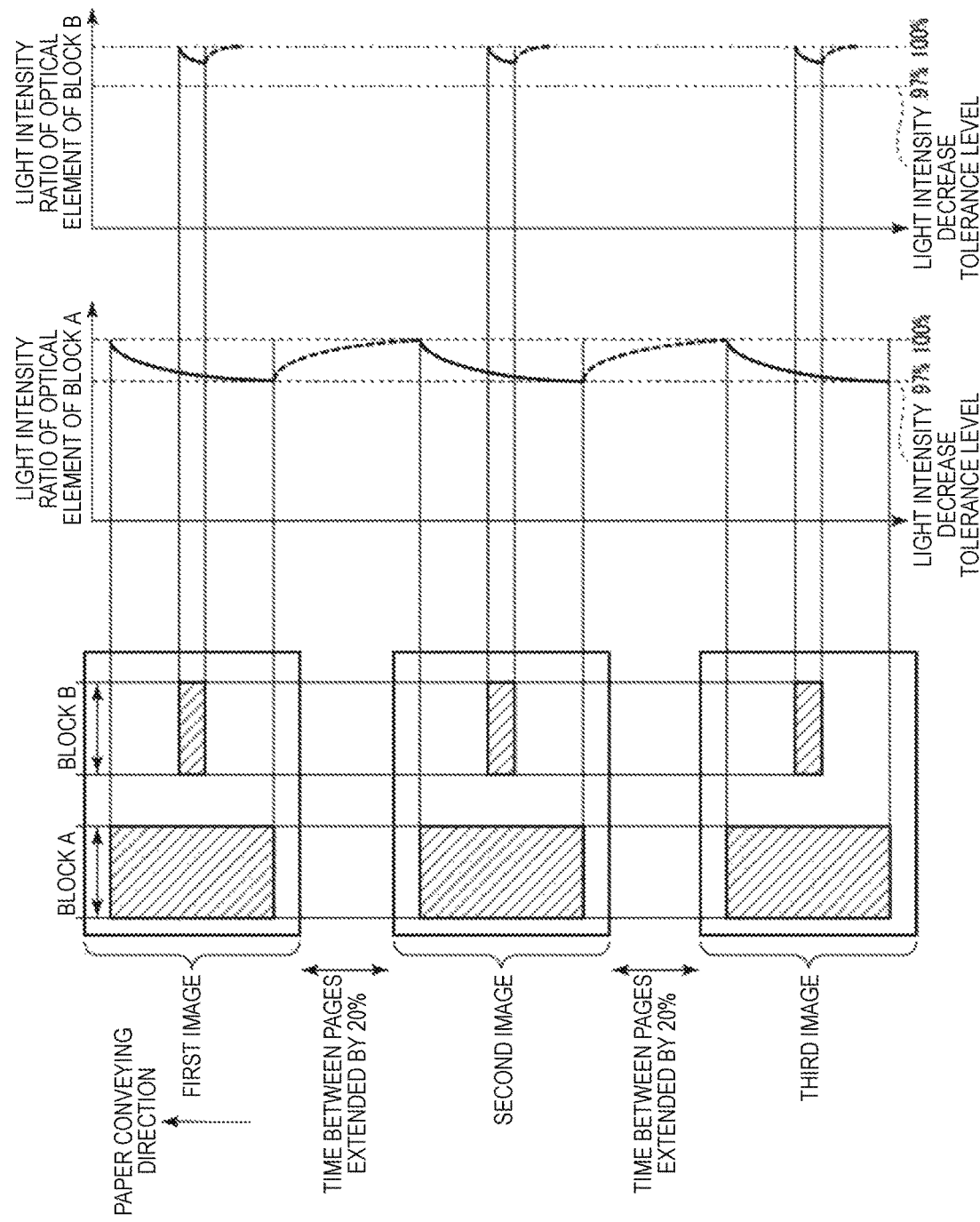
FIG. 19 is a diagram illustrating an example of an emission time of the light emitting element and the influence of a decrease in light intensity when a time interval control to a print start according to the first or second embodiment is applied.

Even when the reference time interval between pages is provided after printing the second image, the light intensity of the light emitting element 131 corresponding to the block A may be not be recovered sufficiently (100%). At the print start of a third image following the second image, the light intensity of the light emitting element 131 corresponding to the block A satisfies the reference (97% or higher). At an early stage of the printing of the third image, the light intensity of the light emitting element 131 corresponding to the block A may be insufficient (lower than 97%) (refer to "light intensity insufficient area Eb"). In addition, at any stage of the printing of the third image, the light intensity of the light emitting element 131 corresponding to the block B is sufficient (97% or higher), FIG. 19 is a diagram illustrating an example of an emission time of the light emitting element and the influence of a decrease in light intensity when the time interval control to a print start is applied according to the first or second embodiment.

At the print start of the first image, the light intensity of the light emitting element 131 corresponding to the block A is sufficient (100%). Even at the final stage of the printing of the first image, the light intensity of the light emitting element 131 corresponding to the block A satisfies the reference (97% or higher) without being insufficient. In addition, at both the start and the final stage of the printing of the first image, the light intensity of the light emitting element 131 corresponding to the block B is sufficient (97% or higher).

When the extended time interval between pages is provided after printing the first image, the light intensity of the light emitting element 131 corresponding to the block A is recovered sufficiently (100%). At the print start of the second image following the first image, the light intensity of the light emitting element 131 corresponding to the block A is sufficient (100%). Even at the latter half of the printing of the second image, the light intensity of the light emitting element 131 corresponding to the block A satisfies the reference (97% or higher) without being insufficient.

When the extended time interval between pages is provided after printing the second image, the light intensity of the light emitting element 131 corresponding to the block A is recovered sufficiently (100%). At the print start of the third image following the second image, the light intensity of the light emitting element 131 corresponding to the block A is sufficient (100%). Subsequently, likewise, the light intensity of the light emitting element 131 corresponding to the block A satisfies the reference (97% or higher) without being insufficient.

In this manner, by applying the time interval control to a print start according to the first or second embodiment, the light intensity of the light emitting element 131 is recovered. Therefore, deterioration in image quality caused by a decrease in light intensity can be prevented.

For example, the control panel 179 may set whether or not to apply the time interval control depending on whether or not the application of the time interval control is input. The nonvolatile memory 177 may store a setting regarding whether or not to apply the time interval control. When the application of the time interval control is set, the controller 174 extends the time interval to a print start based on the detection result of the emission time. As a result, deterioration in image quality caused by a decrease in light intensity can be prevented. In addition, when the application of the time interval control is not set, the controller 174 sets the time interval to a print start to the reference time. As a result, the delay of the print time can be prevented.

The time interval control according to the first and second embodiments is applicable to any of a monochrome image forming apparatus using a single print head and a color image forming apparatus using print heads corresponding to colors. In addition, the case where the detection of the emission time of the light emitting element 131 and the current value for causing the light emitting element 131 to emit light is implemented by software is described. However, the detection may be implemented by hardware. In addition, the case where the timing at which the paper 201 or 202 starts to be conveyed is delayed as a method of extending the time interval between pages is described. However, the conveying speed may be reduced to extend the time interval between pages.

In the above-described image forming apparatus according to at least one embodiment, by increasing a time interval to the next print start according to the length of the emission time, the light intensity of the light emitting element 131 is recovered, and deterioration in image quality can be prevented. In addition, when the current value (voltage value) supplied to the light emitting element 131 is set to be variable, by changing a time interval to the next print start according to the emission time and the current value, the light intensity of the light emitting element 131 is recovered, and deterioration in image quality can be prevented.

While certain embodiments have been described, these embodiments have been presented by way of example only, and are not intended to limit the scope of disclosure. Indeed, the novel apparatus and methods described herein may be embodied in a variety of other forms; furthermore, various omissions, substitutions and changes in the form of the apparatus and methods described herein may be made without departing from the spirit of the disclosure. The accompanying claims and their equivalents are intended to cover such forms or modifications as would fall within the scope and spirit of the disclosure.

What is claimed is:

1. An image forming apparatus comprising:
a print head including one or more light emitting element arrays, each light emitting array including a plurality of light emitting elements;
a detector configured to detect an emission time of the print head that emits light according to image data; and
a controller configured to control a time interval to a print start corresponding to second image data, the second image data following first image data, based on a detection result of an emission time corresponding to the first image data.

2. The apparatus according to claim 1,
wherein the controller is configured to control a time interval from a print end, corresponding to the first image data, to a print start, corresponding to the second image data, based on the detection result of the emission time corresponding to the first image data.

3. The apparatus according to claim 1,
wherein the detector is configured to detect an emission time per light emitting element based on the first image data, and
the controller is configured to control the time interval to the print start corresponding to the second image data based on a longest detected emission time.

4. The apparatus according to claim 1,
wherein the controller is configured to control a timing at which a recording medium starts to be conveyed to print a second image, the second image corresponding to the second image data, based on the detection result of the emission time corresponding to the first image data.

5. The apparatus according to claim 1,
wherein the controller is configured to, when the emission time corresponding to the first image data exceeds a reference time, extend the time interval to the print start corresponding to the second image data.

6. The apparatus according to claim 1,
wherein the controller is configured to, when the emission time corresponding to the first image data exceeds a reference time, delay a timing at which a recording medium starts to be conveyed to print a second image corresponding to the second image data to be later than a reference timing.

7. The apparatus according to claim 1, wherein the controller is configured to, when the emission time corresponding to the first image data is lower than or equal to a reference time, set the time interval to the print start corresponding to the second image data as a reference time.

8. The apparatus according to claim 1, wherein the image forming apparatus is a color image forming apparatus.

9. The apparatus according to claim 1, wherein the light emitting elements include electroluminescent elements.

10. The apparatus according to claim 1, wherein the first image data and the second image data are the same.

11. An image forming apparatus comprising:
a plurality of print heads corresponding to respective colors, each of the print heads including one or more light emitting element arrays, each light emitting element array including a plurality of light emitting elements;
a detector configured to detect an emission time of the print head that emits light according to image data; and
a controller configured to control a time interval to a print start corresponding to second image data, the second image data following first image data, based on a detection result of an emission time corresponding to the first image data, the first image data corresponding to each of the colors, and the second image data corresponding to each of the colors.

12. The apparatus according to claim 11, wherein the detector is configured to detect an emission time per light emitting element based on the first image data in the print heads corresponding to the respective colors, and
the controller is configured to control the time interval to the print start corresponding to the second image data based on the longest detected emission time.

13. A method of operating an image forming apparatus, the image forming apparatus including a print head including one or more light emitting element arrays, each light emitting array including a plurality of light emitting elements, the method comprising:
controlling a time interval to a print start corresponding to second image data, the second image data following first image data, based on a detection result of an emission time corresponding to the first image data.

14. The method according to claim 13, comprising:
controlling a time interval from a print end, corresponding to the first image data, to a print start, corresponding to the second image data, based on the detection result of the emission time corresponding to the first image data.

15. The method according to claim 13, comprising:
detecting an emission time per light emitting element based on the first image data, and
controlling the time interval to the print start corresponding to the second image data based on a longest detected emission time.

16. The method according to claim 13, comprising:
controlling a timing at which a recording medium starts to be conveyed to print a second image, the second image corresponding to the second image data, based on the detection result of the emission time corresponding to the first image data.

17. The method according to claim 13, comprising:
when the emission time corresponding to the first image data exceeds a reference time, extending the time interval to the print start corresponding to the second image data.

18. The method according to claim 13, comprising:
when the emission time corresponding to the first image data exceeds a reference time, delaying a timing at which a recording medium starts to be conveyed to print a second image corresponding to the second image data to be later than a reference timing.

19. The method according to claim 13, comprising:
when the emission time corresponding to the first image data is lower than or equal to a reference time, setting the time interval to the print start corresponding to the second image data as a reference time.

* * * * *